(12) United States Patent
Bailey

(10) Patent No.: US 10,451,208 B1
(45) Date of Patent: Oct. 22, 2019

(54) METHOD AND DEVICE FOR REPAIRING AN IRRIGATION SYSTEM

(71) Applicant: Nathan Bailey, Monticello, AR (US)

(72) Inventor: Nathan Bailey, Monticello, AR (US)

(*) Notice: Subject to any disclaimer, the term of this patent is extended or adjusted under 35 U.S.C. 154(b) by 0 days.

(21) Appl. No.: 15/597,134

(22) Filed: May 16, 2017

Related U.S. Application Data

(60) Provisional application No. 62/337,327, filed on May 16, 2016.

(51) Int. Cl.
    *F16L 55/16*      (2006.01)
    *F16L 55/17*      (2006.01)

(52) U.S. Cl.
    CPC .................................. *F16L 55/17* (2013.01)

(58) Field of Classification Search
    CPC ........................................................ F16L 55/17
    USPC ................... 138/99, 110, 158, 167, 168, 169
    See application file for complete search history.

(56) References Cited

U.S. PATENT DOCUMENTS

| | | | | |
|---|---|---|---|---|
| 4,153,747 A * | 5/1979 | Young | ..................... | B29C 61/10 138/155 |
| 4,465,309 A * | 8/1984 | Nimke | ................. | F16L 21/005 138/99 |
| 4,802,509 A * | 2/1989 | Brandolf | ............. | B29C 61/0616 138/110 |
| 4,877,660 A * | 10/1989 | Overbergh | .......... | B29C 61/0658 138/110 |
| 4,900,596 A * | 2/1990 | Peacock | .................. | B29C 53/36 138/110 |
| 4,985,942 A * | 1/1991 | Shaw | .................. | E04F 11/1836 138/110 |
| 5,651,161 A * | 7/1997 | Asta | .......................... | A47L 9/24 138/110 |
| 5,869,159 A * | 2/1999 | Padilla | ..................... | B32B 7/12 428/40.1 |
| 7,673,655 B1 * | 3/2010 | Morton | ................... | F16L 55/17 138/98 |
| 9,267,634 B2 * | 2/2016 | Baker | ..................... | F16L 55/17 |
| 2006/0118191 A1 * | 6/2006 | Rice | .................... | F16L 55/1686 138/99 |
| 2013/0315672 A1 * | 11/2013 | Pajak | ..................... | F16L 1/028 405/157 |
| 2014/0150913 A1 * | 6/2014 | Baker | ..................... | F16L 55/17 138/98 |

* cited by examiner

*Primary Examiner* — James F Hook
(74) *Attorney, Agent, or Firm* — Schrantz Law Firm, PLLC; Stephen D. Schrantz

(57) ABSTRACT

The repair device secures to an irrigation conduit to seal any failures of the irrigation conduit. A patch body of the present invention is constructed from a plastic film, such as 15 mil polypropylene. The user installs a contact side of the patch body adjacent the irrigation conduit. A seal on the contact side of the repair device is located along the edges of the repair body. The seal encompasses the rupture. Fasteners located on the fastening edges of the patch body secure the repair body around the rupture. The seal and patch body compress the irrigation conduit to seal the failure in the conduit.

20 Claims, 4 Drawing Sheets

METHOD AND DEVICE FOR REPAIRING AN IRRIGATION SYSTEM

CROSS-REFERENCE TO RELATED APPLICATIONS

This application claims priority to and is a continuation in part of U.S. Patent Application No. 62/337,327 entitled POLYPATCH filed on May 16, 2016.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a method and device for repairing an irrigation conduit. The present invention provides a seal that secures around the irrigation conduit to reduce the amount of water leaking from the irrigation conduit.

Farmers today irrigate fields with an irrigation conduit constructed from a thin film that is stored within a roll. The farmer secures the irrigation conduit to a water source to fill the conduit. The farmer lays the roll through the field at or near the crops to be watered. The water fills the conduit to provide the shape of the conduit. The farmer then punctures the conduit at the locations to irrigate the field.

Because the irrigation conduit is constructed from a thin plastic film, the conduit may fail through ruptures, tears, punctures, or otherwise fail at undesirable locations. Such failures may cause issues such as wasting water, over watering, watering areas that do not require water, flooding fields, etc.

The farmer must repair these failures to address such issues. These repairs can require an extended period of time and effort. The present invention resolves these with minimal effort and little time.

II. Description of the Known Art

Patents and patent applications disclosing relevant information are disclosed below. These patents and patent applications are hereby expressly incorporated by reference in their entirety.

U.S. Pat. No. 9,267,634 issued to Baker on Feb. 23, 2016 ("the '634 patent") teaches a wrap-around irrigation tube patch composed of a thin, flexible polymer film and having a closure mechanism for quickly and effectively wrapping and sealing the patch around a damaged section of irrigation tubing. In addition, the present disclosure provides a method for sealing water leaks in irrigation tubing, the method including wrapping a wrap-around irrigation tube patch around a damaged section of irrigation tubing and sealing said patch around the irrigation tubing via a closure mechanism.

SUMMARY OF THE INVENTION

The present invention provides a method and system for repairing an irrigation conduit. As the irrigation conduit ruptures, tears, punctures or otherwise fails, water leaks from the failure in the irrigation conduit. The farmer must then repair the failure in the irrigation conduit. The farmer secures the repair device of the present invention around the failure in the irrigation conduit.

The repair device provides an interior seal, such as a foam seal, a rubber seal, a gasket, a foam and rubber seal, or other seal secured to the repair body, located on the contact side of the repair body. The user installs the repair body and seal around the location of the failure. The seal provides an additional seal against the irrigation conduit to limit the amount of water leaking from the irrigation conduit. The seal of the repair device encompasses the failure to limit the amount of water that leaks from the irrigation conduit.

To apply the repair device to the irrigation conduit, the farmer reduces the water flow or otherwise turns the water off to reduce the pressure on the irrigation conduit. The user then places the repair device around the irrigation conduit at the location of the failure.

The user places the contact side of the repair device against the irrigation conduit. The seal encompasses the location of the failure. The user positions the repair device around the rupture such that the seal encompasses the rupture when the repair device is secured to the irrigation conduit. The seal reduces the amount of water leaking at the failure.

The user then attaches the attachment edges of the repair device to each other. Securing the attachment edges to each other secures the repair device to the irrigation conduit. In one embodiment, the user zips the attachment edges to each other to secure the repair device to the irrigation conduit. In one embodiment, the zipper is a water proof zipper that further limits the amount of water that escapes the repair device. In another embodiment, the user attaches hook and loop fasteners located on the attachment edges to secure the repair device to the irrigation conduit.

In one embodiment, the repair body is constructed from polypropylene. The repair body provides a higher mil polypropylene than the irrigation conduit. In one embodiment, the repair body is constructed from a 10 mil to 20 mil, preferably 15 mil plastic.

It is an object of the present invention to maintain the integrity of the irrigation conduit.

It is an object of the present invention to decrease maintenance time to repair the irrigation conduit.

It is also an object of the present invention to reduce leaks and wasted water through the irrigation conduit.

It is also an object of the present invention to simplify the process of repairing the irrigation conduit.

It is also an object of the present invention to improve the seal on the irrigation conduit.

It is also an object of the present invention to provide a more durable repair on the irrigation conduit.

It is also an object of the present invention to reduce flooding and overwatering of the crops.

It is also an object of the present invention to reduce downtime of the irrigation system.

It is also an object of the present invention to provide a preventative measure to reduce the likelihood of failure of the irrigation conduit.

It is also an object of the present invention to strengthen the irrigation conduit at locations that may experience higher pressure or higher probability of failure due to the placement and/or location of the irrigation conduit.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
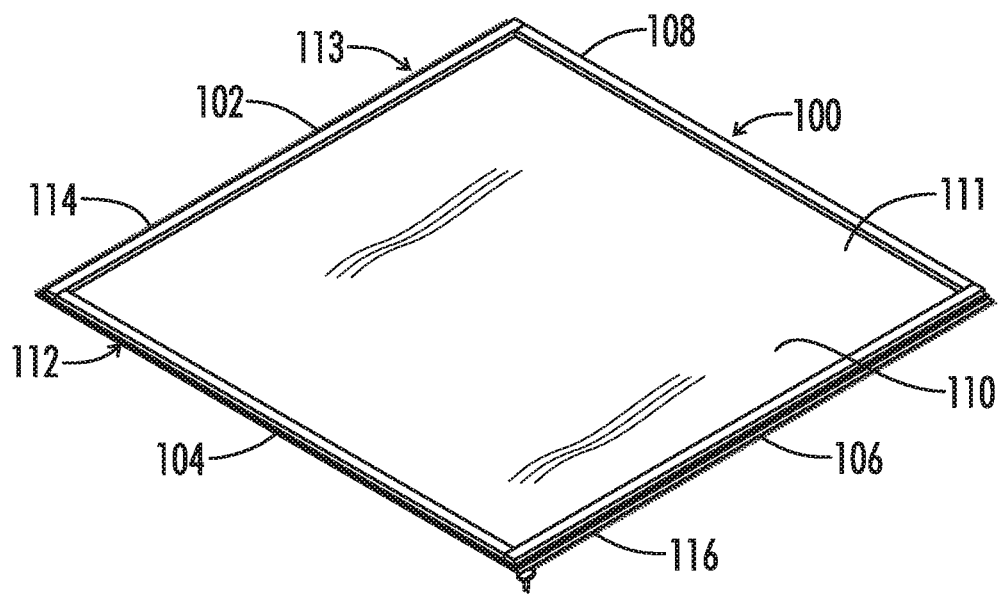
FIG. 1 is a perspective view showing one embodiment of the present invention.

FIG. 1 shows a perspective view of one embodiment of the repair device generally shown as 100. The repair device 100 provides a patch body 110 with seal 112. The seal 112 is located on the contact side 111 of the patch body 110. The user places the contact side 111 of the patch body 110 adjacent the irrigation conduit. The user then attaches the attachment edges 102, 106 to each other around the irrigation conduit. Securing the attachment edges 102, 106 around the irrigation conduit secures the repair device to the irrigation conduit.

The patch body 110 of one embodiment is constructed from a flexible plastic. The flexible plastic enables the user to wrap the repair device 100 around the irrigation conduit to encompass the failure in the irrigation conduit. The repair device 100 is sized to seal against the irrigation conduit.

The patch body 110 of one embodiment is constructed from a polymer film 14. The polymer film of one embodiment is made using a film extrusion and/or forming process, such as a cast film or blown film extrusion process. Other processes may be implemented to manufacture the film. The film may be constructed from any suitable thermoplastic film resin, including but not limited to polyethylene, polypropylene and/or any other thermoplastic capable of forming a thin, flexible film. In particular, low density polyethylene, linear low density polyethylene, and polypropylene are suitable thermoplastic films for use in the present disclosure. The film may be constructed from such films as identified by U.S. Pat. No. 9,267,634 which is incorporated by reference.

In one embodiment, the patch body 110 is constructed from a flexible polymeric film composed of material that is similar or identical to the material of the irrigation tube. In another embodiment, the patch body 110 is constructed from a thicker film, such as 10 to 20 mil, preferably 15 mil. The increased thickness of the patch body 110 provides a more durable repair than the original material from which the irrigation conduit was formed. Such a repair provides a more durable solution at a location at which the irrigation conduit is known to have failed. Such increased thickness of the patch body 110 reduces the possibility of another failure at or near the original failure.

The repair device 100 provides an interior seal 112, such as a foam seal, a rubber seal, a gasket, a foam and rubber seal, or other seal secured to the repair body 110, located on the contact side 111 of the repair body 110. The seal 112 extends along each edge of the contact side 111 of the repair body 110. The seal 112 fully encompasses a rupture or other failure of the irrigation conduit.

Figure 6:
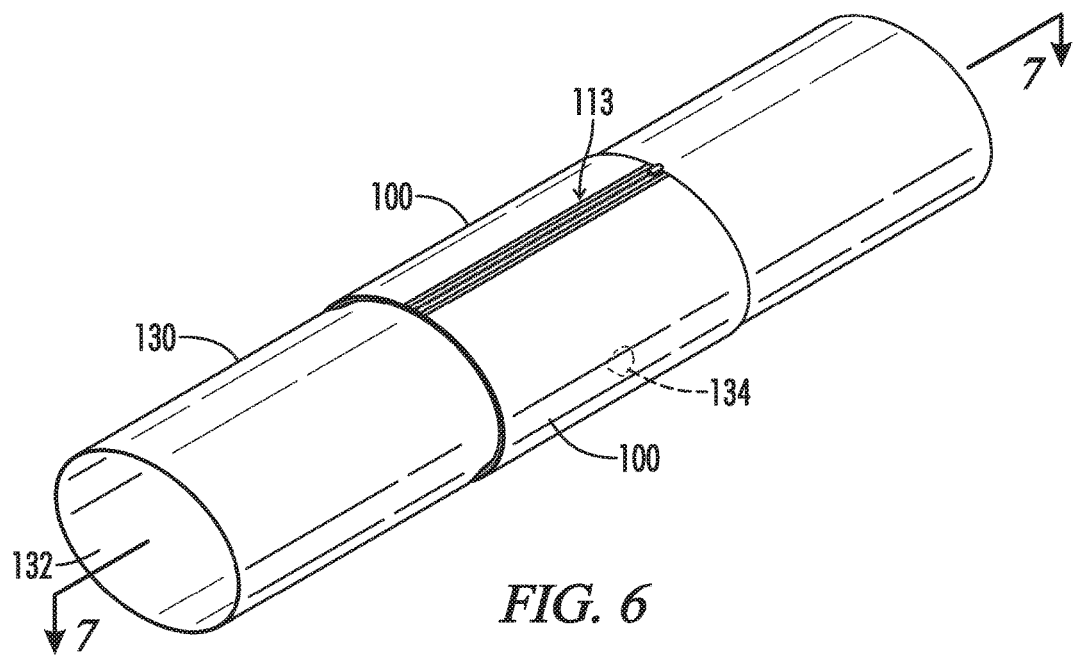
FIG. 6 is an environmental view of one embodiment of the present invention.

The irrigation conduit defines a longitudinal axis allowing the water to flow longitudinally through the irrigation conduit as shown in FIG. 6. Sealing edges 104, 108 as shown in FIG. 1 form the longitudinal edges of the repair device 100. Attachment edges 102, 106 form the lateral edges of the repair device 100.

A fastener 113 secures the attachment edges 102, 106 to each other. The attachment edge 102 attaches to attachment edge 106 to secure the repair device 100 around the irrigation conduit. The fastener 113 maintains the attachment of the repair device 100 around the irrigation conduit. The fastener 113 may include but is not limited to, a zipper 114, 116, a hook and loop fasteners, buttons, clasp, snap fastener, or other fastener. The attachment edges 102, 106 may also be secured together via an adhesive.

FIG. 1 shows an embodiment utilizing a zipper and zipper track 114, 116. Such as embodiment utilizes a YKK zipper that has waterproof characteristics. Such a water proof zipper provides a more durable zipper that resists rusting and other water damage. The water proof zipper also provides another barrier to reduce the amount of water leaking from the repair device 100 at the fastener 113.

Figure 2:
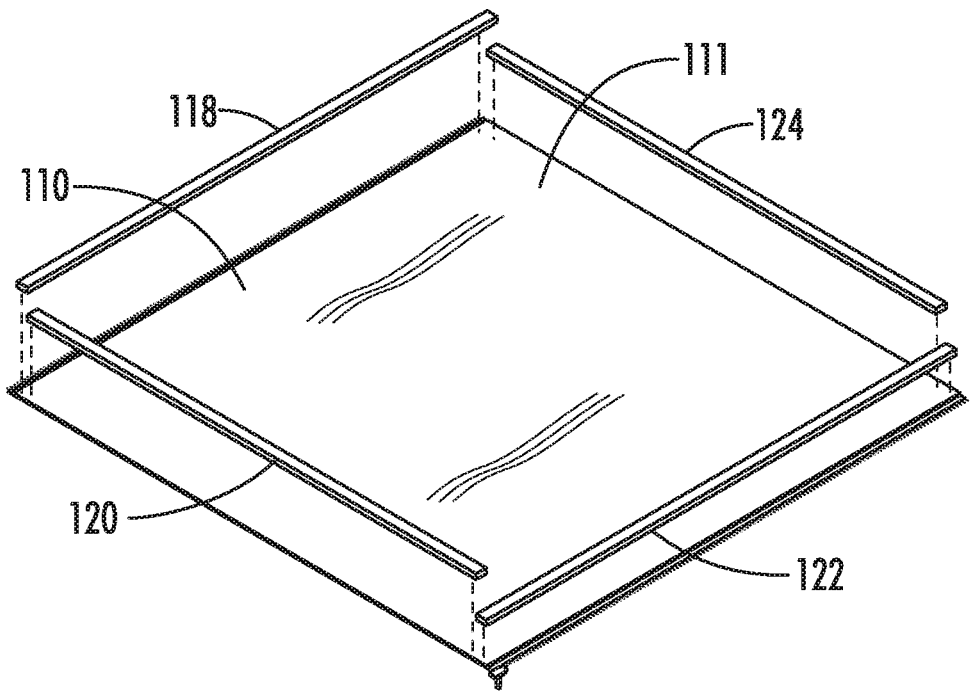
FIG. 2 is an exploded view thereof.
Figure 3:
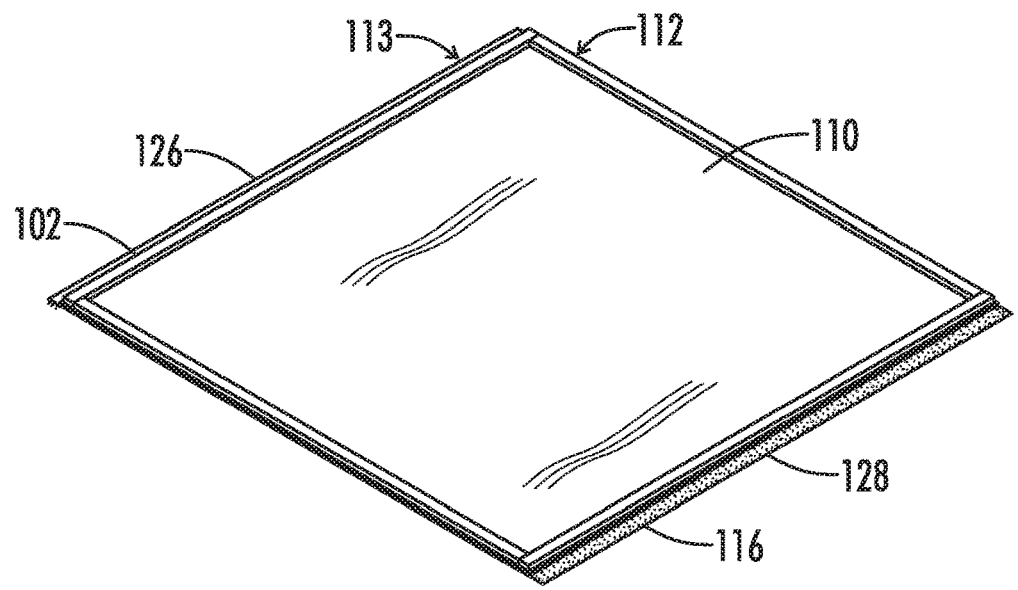
FIG. 3 is a perspective view of one embodiment of the present invention.
Figure 4:
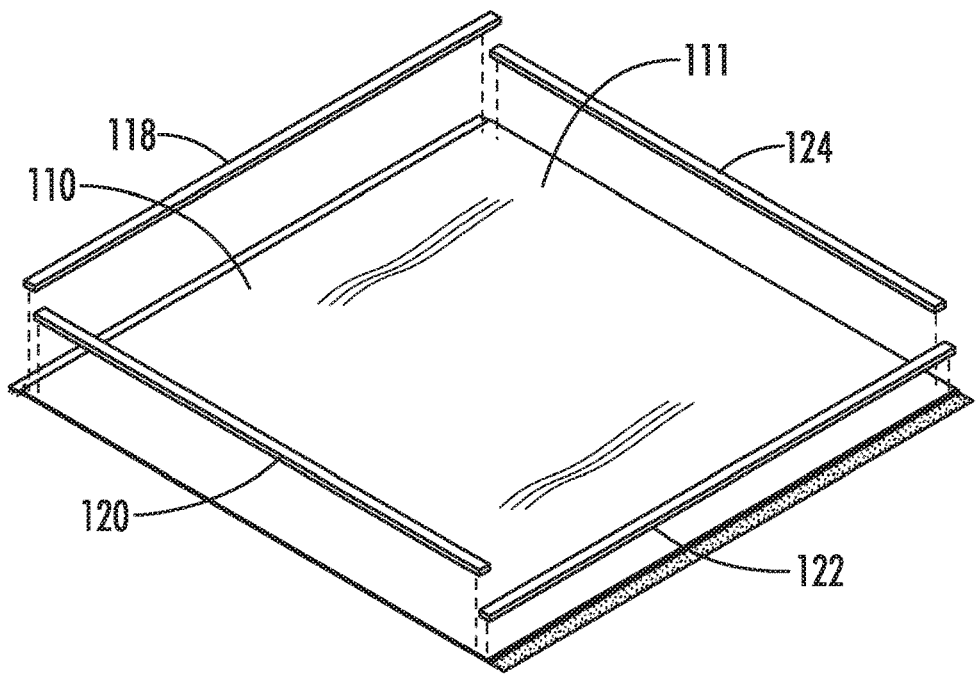
FIG. 4 is an exploded view thereof.

FIGS. 2 and 4 show exploded views with the seal removed. Seal components 118, 120, 122, 124 attach to the contact side 111 of the patch body 110 as shown in FIGS. 1-4. The seal components of one embodiment are sewn to the patch body 110. The sewn attachment reduces the height of the seal to create two separate seals running along each edge.

FIG. 3 shows another embodiment of the repair device that utilizes a hook and loop fastener 126, 128 as fastener 113. The hook and loop fastener 126, 128 is located at attachment edges. The hook and loop fastener 126, 128 secures attachment edge 102 to attachment edge 106. Such attachment of attachment edges 102, 106 to each other secures the repair device to the irrigation conduit.

Figure 5:
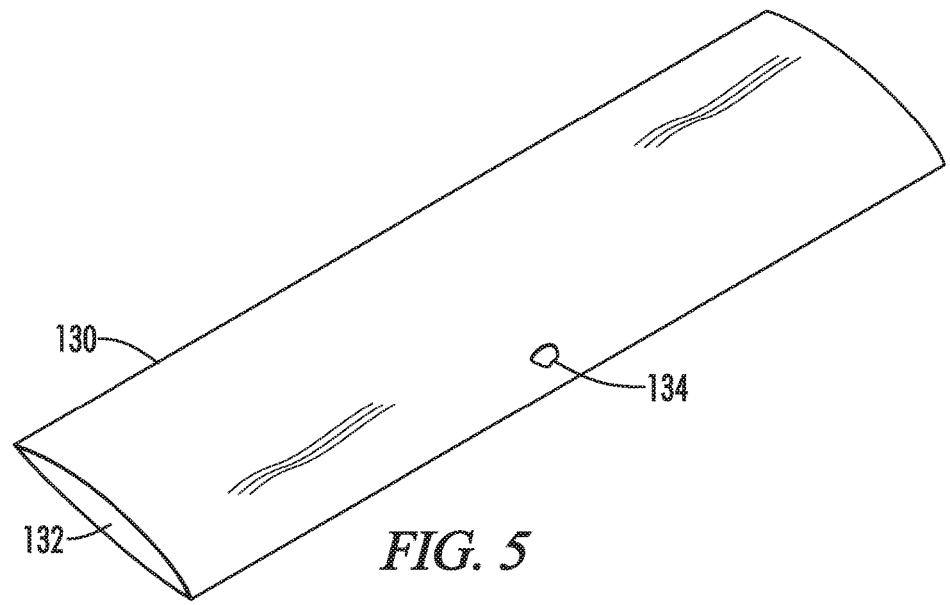
FIG. 5 is an environmental view of an irrigation conduit.

FIGS. 5 and 6 show a view of the irrigation conduit 130 and the repair of the irrigation conduit 130 with the repair device 100. The irrigation conduit 130 as discussed above is constructed from a plastic film. Such film may be packaged within a roll that the user lays out along the area to be irrigated. The irrigation conduit 130 will take the shape of the water as it flows through the irrigation conduit due to the thin film.

The user attaches a water source to opening 132. The water from water source 132 flows through the irrigation conduit 130. Failure 134 has formed in the irrigation conduit 130.

Figure 7:
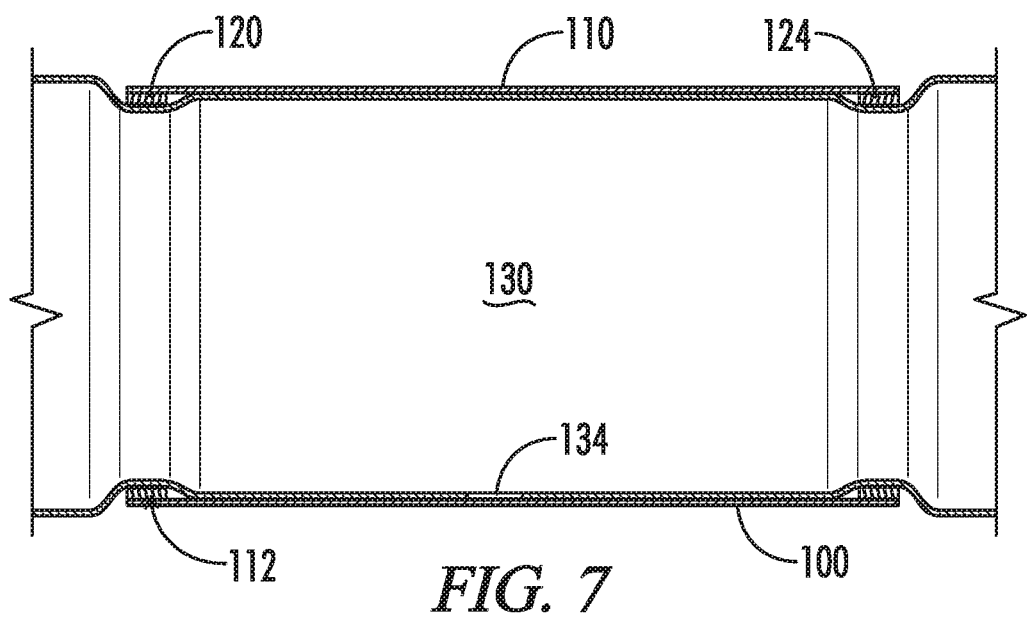
FIG. 7 is a sectional view thereof.

FIGS. 6 and 7 show the repair of failure 134. The user applies the repair device 100 around the irrigation conduit 132 at failure 134. The seal 112 is located around the failure 134. Seal 112, patch body 110, and fastener 113, such as the waterproof zipper, limit the amount of fluid, such as water, that can leak from failure 134.

The user places repair body 100 around the failure 134. In one embodiment, the user positions the repair body 100 such that the failure 134 is located at the patch body, not at the edges or at fastener 113. Such positioning places the failure 134 within the four corners of the seal 112. The seal 112 and patch body 110 function together to seal the failure 134.

FIG. 7 shows a sectional view of the repair device 100 secured to the irrigation conduit 130. The seal 112 is positioned to encompass failure 134 such that the rupture 134 is located within the four corners of the seal 112. The repair body 100 compresses the irrigation conduit 130 to seal the failure. The opening of the repair body with the attachment edges attached is sized with a smaller cross section than the opening of the irrigation conduit. The opening enables the water to properly flow through the irrigation conduit and the repair device.

The user can compress the irrigation conduit 130 to a smaller size than the repair device. Such compression can occur by squeezing the irrigation conduit or by reducing the amount of water within the irrigation conduit 130. The user then attaches the repair device 100 around the rupture. The decreased size of the irrigation conduit 130 enables the user to secure the repair device 100 around the irrigation conduit 130.

Sealing edges with sealing components 120, 124 are located longitudinally away from the rupture. Attachment edges with the sealing components 118, 122 are located laterally of the failure 134.

The seal 112 and patch body 110 seal the rupture by encompassing the rupture. The user then secures the attachment edges to each other with fastener 113. The user can then increase the water flow through the irrigation conduit 130. The increased water flow increases the size of the longitudinal cross section of the irrigation conduit in the opening. The cross section of the opening of the repair device 100 is sized smaller than the cross section of the opening of the irrigation conduit 130. Such difference in sizes of the openings through the irrigation conduit and the repair device enables the repair device to compress the irrigation conduit to seal the irrigation conduit as shown in FIG. 7.

The present invention also provides a method of repairing an irrigation conduit. The user installs the repair body and seal around the location of the failure. The seal provides an additional seal against the irrigation conduit to limit the amount of water leaking from the irrigation conduit. The seal of the repair device encompasses the failure to limit the amount of water that leaks from the irrigation conduit.

To apply the repair device to the irrigation conduit, the farmer compresses the irrigation conduit or reduces the water flow or otherwise turns the water off to reduce the pressure on the irrigation conduit. The reduction of pressure and/or compressing the irrigation conduit reduces the size of the irrigation conduit. The user then places the repair device around the irrigation conduit at the location of the failure.

The user places the contact side of the repair device against the irrigation conduit. The seal encompasses the location of the failure. The user positions the repair device around the rupture such that the seal encompasses the rupture when the repair device is secured to the irrigation conduit. The seal reduces the amount of water leaking at the failure.

The user then attaches the attachment edges of the repair device to each other. Securing the attachment edges to each other secures the repair device to the irrigation conduit. In one embodiment, the user zips the attachment edges to each other to secure the repair device to the irrigation conduit. In one embodiment, the zipper is a water proof zipper that further limits the amount of water that escapes the repair device. In another embodiment, the user attaches hook and loop fasteners located on the attachment edges to secure the repair device to the irrigation conduit.

The user then increases the water flow. The increased water flow increases the size of the irrigation conduit. The irrigation conduit then contacts the repair device. This contact between the repair device and the irrigation conduit seals the rupture. The repair device provides a more durable material at the locations at which the conduit ruptures. This increased durability decreases the chances that a similar failure occurs again at that location. The user may then puncture the repair body at specific locations if the user desires to irrigate at those locations.

In one embodiment, the repair body is constructed from polypropylene. The repair body provides a higher mil polypropylene than the irrigation conduit. In one embodiment, the repair body is constructed from a 10 mil to 20 mil, preferably 15 mil plastic.

The size of the repair body may differ according to the user's needs. The repair body may come in sizes of 36"×10.5", 36"×13.5", 72"×10.5", 72"×13.5". The width may vary according to the size of the irrigation conduit.

The repair device may also be installed as a preventative measure. The increased thickness of the patch body compared to the irrigation conduit creates a more durable outer layer over the irrigation conduit. The increased thickness of the walls of the repair device increases the durability and strength of the irrigation conduit. The increased thickness reduces the likelihood of failure. The increased thickness also strengthens the irrigation conduit at locations that may experience higher pressure or higher probability of failure due to the placement and/or location of the conduit.

The user simply attaches the repair device at such locations to serve as a preventative measure. The user determines those locations that may experiences a higher probability of failure or a higher failure rate. The repair device provides a more durable outer layer to the irrigation conduit that strengthens the conduit.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A repair device for sealing an irrigation conduit wherein the irrigation conduit defines a longitudinal axis along which the water flows through the irrigation conduit, the device comprising:
   a patch body constructed from a flexible material that installs around the irrigation conduit;
   a first attachment edge located on a first edge of the patch body;
   a second attachment edge located on a second edge of the patch body opposite of the first edge and first attachment edge, wherein the second attachment edge attaches to the first attachment edge to secure the patch body around the irrigation pipe;

a contact side of the patch body wherein the contact side is installed adjacent the irrigation conduit wherein the contact side at least partially limits penetration of the water through the contact side;

a first sealing component secured to the contact side wherein the first sealing component extends along a third edge of the patch body wherein the third edge extends between the first attachment edge and the second attachment edge wherein the first sealing component secures to the contact side without adhesively securing to the irrigation conduit;

a second sealing component secured to the contact side wherein the second sealing component extends along a fourth edge of the patch body wherein the fourth edge extends between the first attachment edge and the second attachment edge, and the fourth edge is opposite the third edge, wherein the second sealing component secures to the contact side without adhesively securing to the irrigation conduit;

a first fastener component secured along the first attachment edge of the patch body; and a second fastener component secured along the second attachment edge of the patch body, wherein the first fastener component attaches to the second fastener component.

2. The device of claim 1 further comprising:

a third sealing component secured to the contact side along the first attachment edge longitudinally interior of the first fastener component, wherein the third sealing component secures to the contact side without adhesively securing to the irrigation conduit.

3. The device of claim 2 further comprising:

a fourth sealing component secured to the contact side along the second attachment edge longitudinally interior of the second fastener component, wherein the fourth sealing component secures to the contact side without adhesively securing to the irrigation conduit.

4. The device of claim 1 wherein the first fastener component is a zipper secured along the first attachment edge and the second fastener component is a zipper track secured along the second attachment edge to secure the patch body around the irrigation conduit.

5. The device of claim 4 wherein the zipper is a water proof zipper.

6. The device of claim 1 wherein the first fastener component is a component of a hook and loop fastener and the second fastener component is a component of a hook and loop fastener wherein the first fastener component attaches to the second fastener component to secure the patch body around the irrigation conduit.

7. The device of claim 1 wherein the patch body is constructed from extruded plastic.

8. The device of claim 1 wherein the patch body is constructed from polypropylene.

9. The device of claim 1 wherein the patch body is constructed from 15 mil polypropylene.

10. A repair device for sealing an irrigation conduit wherein the irrigation conduit defines a longitudinal axis along which the water flows through the irrigation conduit, the device comprising:

a patch body constructed from a flexible material that installs around the irrigation conduit;

a first attachment edge located on a first lateral edge of the patch body and a second attachment edge located on a second lateral edge of the patch body wherein the first attachment edge attaches to the second attachment edge to secure the patch body around the irrigation pipe wherein the first attachment edge and the second attachment edge are located on opposite sides of the patch body;

a contact side of the patch body wherein the contact side is installed adjacent the irrigation conduit and is constructed from a material that limits penetration of water through the contact side;

a first sealing component secured to the contact side along a first longitudinal edge, wherein the first sealing component secures to the contact side without directly securing to the irrigation conduit;

a second sealing component secured to the contact side along a second longitudinal edge, wherein the second sealing component secures to the contact side without directly securing to the irrigation conduit;

a first fastener component secured to the patch body along the first attachment edge; and a second fastener component secured to the patch body along the second attachment edge, wherein the first fastener component secures to the second fastener component to attach the first attachment edge to the second attachment edge.

11. The device of claim 10 further comprising:

a third sealing component secured along the first attachment edge on the contact side, wherein the third sealing component secures to the contact side without directly securing to the irrigation conduit.

12. The device of claim 11 further comprising:

a fourth sealing component secured along the second attachment edge on the contact side, wherein the fourth sealing component secures to the contact side without directly securing to the irrigation conduit.

13. The device of claim 12 further comprising:

the third sealing component secured on the contact side longitudinally interior of the first fastener component;

the fourth sealing component secured on the contact side longitudinally interior of the second fastener component;

a seal located on the contact side formed by the first sealing component, second sealing component, third sealing component, and fourth sealing component.

14. The device of claim 13 wherein the first sealing component, second sealing component, third sealing component, and fourth sealing component are sewn to the patch body.

15. The device of claim 14 wherein the first sealing component, second sealing component, third sealing component, and fourth sealing component are constructed from foam and rubber that secure to the contact side without adhesively securing to the irrigation conduit.

16. The device of claim 15 wherein the patch body is constructed from a thermoplastic.

17. The device of claim 16 wherein the patch body is constructed from polypropylene.

18. A repair device for sealing an irrigation conduit wherein the irrigation conduit defines a longitudinal axis along which the water flows through the irrigation conduit, the device comprising:

a patch body constructed from a flexible thermoplastic that installs around the irrigation conduit;

a first attachment edge and a second attachment edge of the patch body wherein the first attachment edge attaches to the second attachment edge to secure the patch body around the irrigation pipe wherein the first attachment edge and the second attachment edge are located on lateral sides of the patch body;

a first fastener component secured to the patch body that extends along the first attachment edge;

a second fastener component secured to the patch body that extends along the second attachment edge and attaches to the first fastener component to secure the first attachment edge to the second attachment edge;

a contact side of the patch body wherein the contact side is installed adjacent the irrigation conduit and wherein the contact side is constructed from a material that limits penetration of water through the contact side; and a seal located on the contact side that extends along the first sealing edge, the second sealing edge, the first attachment edge, and the second attachment edge, wherein the seal secures to the contact side without directly securing to the irrigation conduit via an adhesive.

19. The device of claim 18 wherein the seal is located longitudinally interior of the first fastener component and the second fastener component.

20. The device of claim 19 wherein the patch body is parallelepiped.

* * * * *